UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

INSULATING MATERIAL.

1,096,839. Specification of Letters Patent. Patented May 19, 1914.

No Drawing. Application filed September 20, 1909. Serial No. 518,567.

*To all whom it may concern:*

Be it known that I, JOSEPH L. R. HAYDEN, a citizen of the United States, residing at Schenectady, county of Schenectady, State of New York, have invented certain new and useful Improvements in Insulating Material, of which the following is a specification.

This invention relates to electric insulating material and has for its object the provision of material of this character which will be highly insulating and at the same time very easily and cheaply produced.

One of the objects of my invention is to produce an insulating material which will have its disruptive strength raised upon rise of temperature. It has been found that all the drying animal and vegetable oils have the same effect of enormously decreasing disruptive strength at a moderate increase in temperature. The mineral oils, or paraffins, do not show this decrease, but, on the other hand, increase in resistance with increase of temperature. The mineral oils, however, are not suited for insulation, as they do not dry but are liquid or become liquid with increasing temperature. Furthermore, the solid paraffins are all brittle and not sufficiently tough for use. I have found in the condensation product of a phenolic body and an aldehyde the valuable property of increasing in resistance with increase in temperature. This condensation product is soluble in alcohol; has a fairly high disruptive strength and is very easily applied. The condensation product, however, by itself is unsatisfactory as an insulating material, since it becomes brittle, especially when heated. In order to employ this material, therefore, I have found it necessary to combine it with other materials to give it flexibility and toughness. Inasmuch as the mineral oils have the same properties as the condensation product as regards increasing in disruptive strength with increase of temperature, I employ mineral, or hydrocarbon, oil for mixing with the same. Paraffin oil is well adapted for this purpose, but it has been found that it does not dissolve said condensation product and will not mix with it. Furthermore, no solvent is known which will dissolve both the condensation product and paraffin oil.

I have found that paraffin oil and the phenolic condensation product may both be brought in solution in the same menstruum in the following manner; the condensation product dissolves in alcohol, while paraffin oil dissolves in amylacetate. Alcohol and amylacetate mix readily with each other. By using the combined solution, therefore, of alcohol and amylacetate, these two materials, the phenolic condensation product and paraffin oil, mix and form a clear, transparent solution. Obviously it is important that the proper proportions be used. If too much amylacetate and not enough alcohol is used, the condensation product is thrown down, and if too much alcohol and not enough amylacetate is used, the paraffin oil separates from the solution. As a suitable proportion, I find that a mixture of four parts by volume of an alcoholic solution of condensation product with two parts of paraffin in seven parts of amylacetate is satisfactory. This material when dried forms a rubber-like mass of a character about midway between soft rubber and putty. I have found that this solution of the condensation product and paraffin oil in alcohol and amylacetate can be applied to fabrics or fibrous materials so as to produce a flexible insulating cloth. The compound remains tough and increases in disruptive strength with increase of temperature. The material is capable of wide application in the electrical art.

While I have described my material as being produced in a definite way and with specific materials, it should be understood that I do not limit my invention thereto, since various modifications thereof will suggest themselves to those skilled in the art, without departing from the spirit of my invention, the scope of which is set forth in the annexed claims.

What I claim as new and desire to secure by Letters Patent of the United States, is:—

1. An insulating material composed of phenolic condensation product and hydrocarbon oil dissolved in a mixture of solvents for each of said materials respectively, said solvents being miscible with each other.

2. An insulating material containing a phenolic condensation product and paraffin oil dissolved in a mixture of alcohol and amylacetate.

3. An insulating material comprising a sheet of fibrous material impregnated with a mixture of a phenolic condensation product and hydrocarbon oil dissolved in alcohol and amylacetate.

4. A composition of matter comprising a resinous condensation product, an oil and solvents for said respective substances, said solvents being miscible with each other.

5. A composition of matter comprising a phenolic condensation product, a solvent therefor, an oil and a solvent for said oil, said solvents being miscible with each other.

6. A composition of matter, comprising a phenolic condensation product, an oil and a mixture of solvents for said materials comprising ethyl alcohol and amylacetate.

In witness whereof I have hereunto set my hand this 18th day of September, 1909.

JOSEPH L. R. HAYDEN.

Witnesses:
BENJAMIN B. HULL,
EMMA B. COONS.